(12) United States Patent
Weerasooriya et al.

(10) Patent No.: US 9,175,207 B2
(45) Date of Patent: Nov. 3, 2015

(54) SURFACTANT-LESS ALKALINE-POLYMER FORMULATIONS FOR RECOVERING REACTIVE CRUDE OIL

(75) Inventors: Upali P. Weerasooriya, Austin, TX (US); Gary A. Pope, Cedar Park, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 245 days.

(21) Appl. No.: 13/115,433

(22) Filed: May 25, 2011

(65) Prior Publication Data

US 2011/0290482 A1    Dec. 1, 2011

Related U.S. Application Data

(60) Provisional application No. 61/347,850, filed on May 25, 2010.

(51) Int. Cl.
*E21B 43/16* (2006.01)
*C09K 8/68* (2006.01)
*C09K 8/588* (2006.01)

(52) U.S. Cl.
CPC ...................... *C09K 8/588* (2013.01)

(58) Field of Classification Search
CPC ........... E21B 43/22; C09K 8/588; C09K 8/58
See application file for complete search history.

(56) References Cited

U.S. PATENT DOCUMENTS

| | | | |
|---|---|---|---|
| 3,943,160 A | 3/1976 | Farmer, III et al. | |
| 4,004,638 A | 1/1977 | Burdyn et al. | |
| 4,036,300 A | 7/1977 | Holm et al. | |
| 4,060,490 A * | 11/1977 | Bernard | 507/225 |
| 4,120,358 A | 10/1978 | Kalfoglou | |
| 4,293,428 A * | 10/1981 | Gale et al. | 507/238 |
| 4,331,543 A | 5/1982 | Wilson et al. | |
| 4,359,093 A * | 11/1982 | Bernard | 166/400 |
| 4,460,481 A | 7/1984 | Schievelbein | |
| 4,493,371 A | 1/1985 | Reisberg et al. | |
| 4,548,268 A | 10/1985 | Stipanovic | |
| 4,778,590 A | 10/1988 | Reynolds et al. | |

(Continued)

FOREIGN PATENT DOCUMENTS

| CN | 1079486 C | 2/2002 |
|---|---|---|
| CN | 101020815 | 8/2007 |

(Continued)

OTHER PUBLICATIONS

International Bureau of WIPO, International Preliminary Report on Patentability, International Application No. PCT/US2011/037903, dated Dec. 6, 2012.

(Continued)

*Primary Examiner* — Zakiya W Bates
*Assistant Examiner* — Silvana Runyan
(74) *Attorney, Agent, or Firm* — Meunier Carlin & Curfman LLC

(57) ABSTRACT

Compositions and methods for oil recovery using a surfactant-less alkaline-polymer system in hard water or hard brine is described in the instant invention. The formulation further includes a chelating agent, an alkaline agent (which can be the same as the chelating agent), and a co-solvent. The formulations as disclosed herein are capable of forming a surfactant in-situ resulting in Winsor Type III micro-emulsions of low interfacial tension.

50 Claims, 2 Drawing Sheets

(56) References Cited

U.S. PATENT DOCUMENTS

| | | | |
|---|---|---|---|
| 4,976,315 A | | 12/1990 | Prukop et al. |
| 5,068,043 A | * | 11/1991 | Thigpen et al. ............... 507/213 |
| 6,402,934 B1 | * | 6/2002 | Chheda et al. .................. 208/44 |
| 2008/0312108 A1 | * | 12/2008 | Berger et al. ................. 507/213 |
| 2011/0059873 A1 | | 3/2011 | Weerasooriya et al. |
| 2012/0097389 A1 | * | 4/2012 | Dwarakanath et al. .... 166/270.1 |

FOREIGN PATENT DOCUMENTS

| | | |
|---|---|---|
| WO | 2011/031946 | 3/2011 |
| WO | 2011031920 | 3/2011 |
| WO | 2011150060 | 12/2011 |

OTHER PUBLICATIONS

Hill H.J. et al., "Cation Exchange and Chemical Flooding; Journal of Petroleum Technology," Journal of Petroleum Technology, Oct. 1977; pp. 1336-1338.

Nelson, R.C. et al., "Cosurfactant-Enhanced Alkaline Flooding," SPE/DOE Fourth Symposium on Enhanced Oil Recovery; Apr. 15-18, 1984.

Hirasaki, George J., "Application of the Theory of Multicomponent. Multiphase Displacement to Three-Component, Two-Phase Surfactant Flooding," Society of Petroleum Engineers Journal: Apr. 1981; pp. 191-204.

International Search Report and the Written Opinion of the International Searching Authority, International Application No. PCT/US2011/037903, Feb. 17, 2012, 9 pages.

Observations by Third Party filed in European Patent Application No. 11787323.2, filed Jul. 3, 2013, 7 pgs.

Sasol Marketing Brochure, "Alcohol Ethoxylates: Versatile Alternatives for Technical Applications" Sasol North America, Inc., 16 pgs.

Garnett, Christopher J., et al. "Kinetics of the Acid-Catalysed Hydrolysis of Dodecylsulphate and Dodecyldiethoxysulphate Surfactants in Concentrated Micellar Solutions: Part 1.—Effects of Acid and Surfactant Concentrations and of the Nature and Concentration of Counterions," J. Chem. Soc., Faraday Trans. 1, 1983, 79, pp. 953-964.

Garnett, Christopher J., et al. "Kinetics of the Acid-Catalysed Hydrolysis of Dodecylsulphate and Dodecyldiethoxysulphate Surfactants in Concentrated Micellar Solutions: Part 2.—Effects of Added Electrolytes on the Hydrolysis of Sodium Dodecylsulphate and Sodium Dodecyldiethoxysulphate," J. Chem. Soc., Faraday Trans. 1, 1983, 79, pp. 965-973.

Adkins, S., et al., "A New Process for Manufacturing and Stabilizing High-Performance EOR Surfactants at Low Cost for High-Temperature, High Salinity Oil Reservoirs," Paper SPE 129923, presented at the 2010 SPE Improved Oil Recovery Symposium, Tulsa, Oklahoma, Apr. 24-28, 2010, 10 pages.

Daoshan, L., et al., "The effect of biosurfactant on the interfacial tension and adsorption loss of surfactant in ASP flooding," Colloids and Surfaces A: Physiochemical Engineering Aspects, vol. 244, 2004, pp. 53-60.

Deng, S., et al., "Effects of alkaline/surfactant/polymer on stability of oil droplets in water from ASP flooding," Colloids and Surfaces A: Physiochemical Engineering Aspects, vol. 211, 2002, pp. 275-284.

Flaaten, A., "Experimental Study of Microemulsion Characterization and Optimization in Enhanced Oil Recovery: A Design Approach for Reservoirs with High Salinity and Hardness," Thesis, The University of Texas at Austin, Dec. 2007, 285 pages.

Healy, R.N., et al., "Multiphase Microemulsion Systems," Society of Petroleum Engineers Journal, vol. 16, No. 3, Jun. 1976, pp. 147-160.

Holm, L.W., et al., "Improved Micellar-Polymer Flooding with High pH Chemicals," Society of Petroleum Engineers, American Institute of Mining, Metallurgical and Petroleum Engineering, Inc., Oct. 1-3, 1978, 15 pages.

Huh, C., "Interfacial Tensions and Solubilizing Ability of a Microemulsion Phase That Coexists With Oil and Brine," Journal of Colloid and Interface Science, vol. 71, No. 2, 1979, pp. 408-426.

Jackson, A.C., "Experimental Study of the Benefits of Sodium Carbonate on Surfactants for EOR," Thesis, the University of Texas at Austin, Dec. 2006, 210 pages.

Johnson, C.E., "Status of Caustic and Emulsion Methods," Journal of Petroleum Technology, Jan. 1976, pp. 85-92.

Talley, L.D., "Hydrolytic Stability of Alkylethoxy Sulfates," SPE Reservoir Engineering, Feb. 1988, pp. 235-242.

Yang, H., et al., "Low-Cost, High-Performance Chemicals for Enhanced Oil Recovery," Paper SPE 129978, presented at the 2010 SPE Improved Oil Recovery Symposium, Tulsa, Oklahoma, Apr. 24-28, 2010, 24 pages.

Zhao, P., Development of High-Performance Surfactants for Difficult Oils, Thesis, The University of Texas at Austin, Dec. 2007, 122 pages.

Related U.S. Appl. No. 12/879,231, filed Sep. 10, 2010.

International Preliminary Report on Patentability and Written Opinion, dated Nov. 27, 2012, in corresponding International Application No. PCT/US2011/037903.

International Preliminary Report on Patentability and Written Opinion, dated Mar. 13, 2012, in related International Application No. PCT/US2010/048353.

International Preliminary Report on Patentability and Written Opinion, dated Mar. 13, 2012, in related International Application No. PCT/US2010/048393.

International Search Report, dated May 31, 2011, in related International Application No. PCT/US2010/048393.

Flaaten, et al. "ASP Chemical Chemical Flooding Without the Need for Soft Water," SPE 116754 presented at the 2008 SPE Annual Technical Conference and Exhibition, Denver, Colorado, Sep. 21-24, 2008, 15 pages.

Request for Ex Parte Reexamination of U.S. Pat. No. 8,188,012, filed May 14, 2014.

Wang et al., "Study on Mild Carbonoxylic Acid Combinational Flooding System (II)—Directed to Extremely Complicated Oilfield in Central China". Daily Chemical Industry, vol. 34, No. 1, pp. 8-12, and 33.

\* cited by examiner

US 9,175,207 B2

SURFACTANT-LESS ALKALINE-POLYMER FORMULATIONS FOR RECOVERING REACTIVE CRUDE OIL

CROSS-REFERENCE TO RELATED APPLICATIONS

This application for patent claims the benefit of priority from U.S. Provisional Patent Application Ser. No. 61/347,850, filed May 25, 2010, entitled "Novel Alkaline Formulations In Hard Brine For Recovering Reactive Crude Oil," which provisional patent application is commonly assigned to the assignee of the present invention, and which disclosure is considered part of and is incorporated by reference in its entirety in the disclosure of this application.

TECHNICAL FIELD OF THE INVENTION

The present invention relates in general to the field of oil recovery, and more specifically to a novel surfactant-less systems for oil recovery.

BACKGROUND OF THE INVENTION

Without limiting the scope of the invention, its background is described in connection with the recovery of oil from subterranean oil-bearing formations. The present invention relates to post-primary recovery of oil from subterranean oil-bearing formations and includes improved techniques for enhancing the oil displacement efficiency of a post-primary oil recovery process.

Generally, water flooding and surfactant flooding are processes well known in the art to recover the vast quantities of oil which remain in the formation after primary oil recovery operations and it has been common to use surfactants and surfactant systems for oil recovery. Surfactants contain a hydrophobic part and a hydrophilic part at opposite ends of a long molecule that tend to orient at an interface with its hydrophobic portion in the oil and its hydrophilic portion in the aqueous phase. For liberating oil from a petroleum reservoir, a surfactant must, in general, stay in the interface in order to lower the interfacial tension. It must be heavy enough that normal thermal perturbations do not displace it into one phase or the other and be able to reduce the interfacial tension between oil and aqueous reservoir fluid from around 30 dynes per centimeter to a few millidynes per centimeter or less. In addition the surfactant must be able to move into and out of the surface in an unhindered manner and not function as an emulsifier in the usual sense, producing, as it does, an unstable emulsion.

Alkaline-surfactant-polymer (ASP) flooding was developed to reduce the interfacial tension between oil and water to displace the discontinuous trapped oil remaining after the waterflood. Alkaline-surfactant-polymer flooding is described in commonly owned and co-pending U.S. patent application Ser. No. 12/879,231, filed Sep. 10, 2010.

United States Patent Application No. 20080312108 (Berger and Berger, 2008) discloses compositions and process for recovering of oil from subterranean oil-bearing reservoirs consisting of green non-toxic biodegradable strong alkali metal salt of polymerized weak acids, one or more surfactants, an aqueous fluid, and optionally one or more mobility control agents and optionally one or more co-solvents. Such compositions are injected into the reservoir through one or more injection wells and assist in recovering trapped oil through one or more producing wells. The compositions and the process described in the invention offer the advantage of improved compatibility with unsoftened waters, surfactants, and various mobility control agents. The green non-toxic, biodegradable properties of the alkali makes it particularly suitable for environmentally sensitive applications such as offshore and inland lakes U.S. Pat. No. 4,004,638 issued to Burdyn et al. (1977) teaches recovery of oil from subterranean oil reservoirs by water flooding employing an alkaline agent and a sulfonate surfactant. An aqueous initiation slug containing an alkaline agent selected from the group consisting of alkali metal and ammonium hydroxides is injected into the reservoir via a suitable injection system. Thereafter an aqueous surfactant slug is injected into the reservoir behind the initiation slug. The surfactant slug contains a sulfonate surfactant and an alkaline agent. Subsequent to injection of the surfactant slug, an aqueous flooding medium is injected in order to displace the oil within the reservoir to a production system from which it is recovered. A portion of the flooding medium may contain a thickening agent for mobility control purposes.

U.S. Pat. No. 4,976,315 issued to Prukop and Chea (1990) discloses a method for increasing the recovery of oil in enhanced oil recovery operations employing anionic surfactant by blending a taurine with said anionic surfactant. The taurine may also increase the salt and divalent ion tolerance of the anionic surfactant.

Sulfonate surfactants have been the exclusive choice for high temperature application due to presumed instability of ether sulfate (ES) surfactants. As sulfonates in general are more expensive than sulfates, the costs were prohibitively high in some cases for enhanced oil recovery (EOR) to be even considered.

U.S. Pat. No. 4,331,543 issued to Wilson and Pao (1982) describes a process for the recovery of oil from subterranean oil reservoirs by waterflooding employing ether-linked sulfonate surfactants in which oxidative degradation of the surfactant is retarded through the establishment of an anaerobic condition in the surfactant solution or through the use of oxidation inhibitors. According to the '543 patent the anaerobic condition may be provided by mechanical means such as scrubbing the injected water with an inert gas in order to remove oxygen or by employing produced well water which is handled under a closed system to exclude oxygen. A preferred class of oxidation inhibitors is sterically hindered phenolic compounds which function as free radical chain inhibitors.

U.S. Pat. No. 3,943,160 issued to Farmer et al. (1976) describes a waterflood oil recovery process, in which a mixture of petroleum sulfonate and alkoxylated alcohol sulfate surfactants is injected into a reservoir to displace oil, which is improved by using a sulfate surfactant that contains at least one chain-branching substituent on a carbon atom alpha or beta to the sulfate group. In a reservoir that is relatively hot, the improved process provides good oil-displacement efficiency and polyvalent metal ion compatibility in addition to improved stability towards hydrolytic decomposition of the sulfate surfactant.

A large number of petroleum reservoirs have some hardness (divalent cations) in the water, and thus pose a great threat to the aqueous stability of the chemicals injected. Divalent cations precipitate with alkali, surfactant and polymer and result in plugging during injection. In addition, hardness has a dominant impact on phase behavior especially at low concentration of surfactant (Nelson, 1984) and this can cause high surfactant retention by ion exchange between the surfactant, brine, and clay (Hill, et al., 1977; Hirasaki, 1981). Therefore, extra measures are taken to test the compatibility of the injection chemicals with brine. One measure is softening of injection water, which is an expensive process that in some cases is not feasible.

SUMMARY OF THE INVENTION

The present invention relates to the use of new surfactant-less systems for oil recovery and is applicable to crude oil of high activity.

In general, in one aspect, the invention features a surfactant-less alkaline-polymer composition for treating a hydrocarbon-bearing formation. The surfactant-less alkaline-polymer composition includes water this is hard water or hard brine. The surfactant-less alkaline-polymer composition further includes a chelating agent. The agent is operable for forming a soluble salt with hardness ions when subjected to reservoir conditions of the hydrocarbon-bearing formation. The surfactant-less alkaline-polymer composition further includes an alkaline agent. The alkaline agent is the chelating agent, a different alkaline agent, or a combination thereof. The alkaline agent is also operable for interacting with carboxylic acid in the hydrocarbon-bearing formation at reservoir conditions of the hydrocarbon-bearing formation to generate an in-situ soap. The surfactant-less alkaline-polymer composition further includes a co-solvent. The co-solvent is hydrophilic. The co-solvent is also operable for interacting with the in-situ generated soap at the reservoir conditions of the hydrocarbon-bearing formation to produce an optimum surfactant. The surfactant-less alkaline-polymer composition further includes a polymer. The water, the chelating agent, the alkaline agent, the co-solvent, and the polymer are mixed together in the composition.

Implementations of the invention can include one or more of the following features:

The water can include divalent cations. The chelating agent can be further operable for preventing precipitation of the divalent cations when subjected to reservoir conditions of the hydrocarbon-bearing formation.

The chelating agent can be ethylenediaminetetraacetic acid (EDTA), ethylenediamine tetracetic acid tetra sodium salt (EDTA $Na_4$), EDTA salts, acrylic polymers, ascorbic acid, tetrasodium iminodisuccinate, citric acid, dicarboxymethylglutamic acid, ethylenediaminedisuccinic acid (EDDS), maleic acid, nitrilotriacetic acid (NTA), nonpolar amino acids, methionine, oxalic acid, phosphoric acid, polar amino acids, arginine, asparagine, aspartic acid, glutamic acid, glutamine, lysine, ornithine, siderophores, desferrioxamine B, hydrolysed wool, succinic acid, alkali earth metal hydroxides, NaOH, KOH, LiOH, ammonia, $Na_2CO_3$, $NaHCO_3$, Na-metaborate, sodium silicate, sodium orthosilicate, other polycarboxylates, or any combination thereof.

The chelating agent can be the alkaline agent.

The chelating agent can include $Na_2CO_3$.

The chelating agent can include EDTA $Na_4$.

The chelating agent can include EDTA $Na_4$ and $Na_2CO_3$.

The concentration of the chelating agent in the composition can be between 0.1 wt % and 10 wt %.

The chelating agent can be EDTA $Na_4$.

The co-solvent can be non-ionic.

The co-solvent can include an ethoxylate.

The co-solvent can be a short chain alcohol, a glycol ethers, a derivative of a short chain alcohol, or a combination or modifications thereof.

The concentration of the co-solvent in the composition can be between about 0.1 wt % and 1 wt %.

The concentration of the chelating agent in the composition can be between 0.1 wt % and 10 wt %.

The co-solvent can include $C_{12-15}$-12EO.

The concentration of the $C_{12-15}$-12EO in the composition can be between 0.2 wt % and 0.4 wt %.

The concentration of the $C_{12-15}$-12EO in the composition can be about 0.4 wt %.

The polymer can include a high molecular weight water-soluble polymer.

The polymer can be a polyacrylamide, a co-polymer of a polyacrylamide, a partially hydrolyzed polyacrylamide (HPAM) polymer, or a combination thereof.

The alkaline agent can include a non-chelating amine or an inorganic alkaline agent providing alkalinity.

The alkaline agent can include a non-chelating amine that is dimethylaminopropylamine, diethylenetriamine (DETA), or another polyalkylene polyamine.

The water can include ions selected from the group consisting of $Ca^{+2}$, $Ba^{+2}$, $Mg^{+2}$, $Sr^{+2}$, and combinations thereof.

The water can include divalent cations.

The chelating agent can include EDTA $Na_4$, and the weight ratio of the EDTA to the divalent cations can be at least about 9:1.

The pH of the composition can be between about 10.0 and about 11.0.

The pH of the composition can be between 10.2 and 10.8.

The reservoir conditions can include a temperature between 25° C. and 120° C.

The composition can be operable for forming Winsor Type III micro-emulsions upon injection into the hydrocarbon-bearing formation.

The Winsor Type III micro-emulsions can have interfacial tensions less than about 5 millidynes/cm.

In general, in another aspect, the invention features a method of treating a hydrocarbon-bearing formation to recover oil. The method includes injecting a surfactant-less alkaline-polymer composition into the hydrocarbon bearing formation. The surfactant-less alkaline-polymer composition includes water, a chelating agent, an alkaline agent, a co-solvent, and a polymer mixed together in the surfactant-less alkaline-polymer composition. The water is hard water or hard brine and includes divalent cations. The alkaline agent is the chelating agent, a different alkaline agent, or a combination thereof. The co-solvent is hydrophilic. The method further includes generating a surfactant in-situ in the hydrocarbon bearing formation. During this step, the alkaline agent forms a soap after injecting the surfactant-less alkaline-polymer composition into the hydrocarbon formation, and the co-solvent interacts with the in-situ generated soap and makes an optimum surfactant. The method further includes recovering the oil from the hydrocarbon-bearing formation.

Implementations of the invention can include one or more of the following features:

The chelating agent can prevent precipitation of the divalent ions in the water during generation of the surfactant in-situ.

The chelating agent can be ethylenediaminetetraacetic acid (EDTA), ethylenediamine tetracetic acid tetra sodium salt (EDTA $Na_4$), EDTA salts, acrylic polymers, ascorbic acid, tetrasodium iminodisuccinate, citric acid, dicarboxymethylglutamic acid, ethylenediaminedisuccinic acid (EDDS), maleic acid, nitrilotriacetic acid (NTA), nonpolar amino acids, methionine, oxalic acid, phosphoric acid, polar amino acids, arginine, asparagine, aspartic acid, glutamic acid, glutamine, lysine, ornithine, siderophores, desferrioxamine B, hydrolysed wool, succinic acid, alkali earth metal hydroxides, NaOH, KOH, LiOH, ammonia, $Na_2CO_3$, $NaHCO_3$, Na-metaborate, sodium silicate, sodium orthosilicate, other polycarboxylates, or any combination thereof.

The chelating agent can be the alkaline agent.

The chelating agent can include $Na_2CO_3$.

The chelating agent can include EDTA $Na_4$.

The chelating agent can include EDTA $Na_4$ and $Na_2CO_3$

The concentration of the chelating agent in the composition can be between 0.1 wt % and 10 wt %.

The chelating agent can be EDTA $Na_4$.

The co-solvent can be non-ionic.

The co-solvent can include an ethoxylate.

The co-solvent can be a short chain alcohol, a glycol ethers, a derivative of a short chain alcohol, or a combination or modifications thereof.

The concentration of the co-solvent in the composition can be between about 0.1 wt % and 1 wt %.

The concentration of the chelating agent in the composition can be between 0.1 wt % and 10 wt %.

The co-solvent can include $C_{12-15}$-12EO.

The concentration of the $C_{12-15}$-12EO in the composition can be between 0.2 wt % and 0.4 wt %.

The concentration of the $C_{12-15}$-12EO in the composition can be about 0.4 wt %.

The polymer can include a high molecular weight water-soluble polymer.

The polymer can be a polyacrylamide, a co-polymer of a polyacrylamide, a partially hydrolyzed polyacrylamide (HPAM) polymer, or a combination thereof.

The alkaline agent can include a non-chelating amine or an inorganic alkaline agent providing alkalinity.

The alkaline agent can include a non-chelating amine that is dimethylaminopropylamine, diethylenetriamine (DETA), or another polyalkylene polyamine.

The water can include ions selected from the group consisting of $Ca^{+2}$, $Ba^{+2}$, $Mg^{+2}$, $Sr^{+2}$, and combinations thereof.

The chelating agent can include EDTA $Na_4$, and the weight ratio of the EDTA to the divalent cations can be at least about 9:1.

The pH of the composition can be between about 10.0 and about 11.0.

The pH of the composition can be between 10.2 and 10.8.

The reservoir conditions can include a temperature between 25° C. and 120° C.

The generation of the in-situ surfactant can result in Winsor Type III micro-emulsions.

The Winsor Type III micro-emulsions can have interfacial tensions less than about 5 millidynes/cm.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Formulations and Treatments

The present invention relates to the use of new surfactant-less systems for oil recovery and is applicable to crude oil of high activity, i.e., high acid number or more precisely, the saponification number, which under alkalinity generates high surfactant (arylic or other soap) levels in-situ. When the injection water is hard brine, the alkalinity is introduced using a suitable chelating agent (also referred to as a chelant) that prevents precipitation of $Ca^{+2}$ and $Mg^{+2}$ ions. The surfactant, thus generated, is generally hydrophobic. By using an appropriate co-solvent system, a surfactant-free formulation in hard brine has been developed that, in contact with the crude oil, gives Winsor Type III micro-emulsions of low Interfacial Tension (IFT).

Middle phase Micro-emulsions of low Interfacial Tension (IFT) are generated by using only co-solvent(s) without any added surfactants when dealing with active oils and hard brine, (i.e., containing $Ca^{+2}$, $Ba^{+2}$, $Mg^{+2}$, or $Sr^{+2}$, or combinations thereof and generally containing high salinity of from about 1% to about 30% total dissolved solids). The present invention relates to active oils that can generate surfactants (naphthenics, among others) in-situ in sufficient quantities that will obviate the need for any added surfactants in enhanced oil recovery (EOR) formulations.

The present invention utilizes a chelating agent or agents (such as EDTA-4Na) with hard brine. At a correct usage level, this chelating agent (for example 1% EDTA-4Na) provides adequate protection against Ca/Mg (for example 900 ppm) precipitation. However, in lieu of providing a surfactant in the composition being pumped downhole, a surfactant-less composition can be utilized and the surfactant is generated in-situ. Alkalinity is needed for such in-situ surfactant generation. A hydrophilic co-solvent (such as a very hydrophilic ethoxylate) is thus utilized in the composition.

Figure 1:
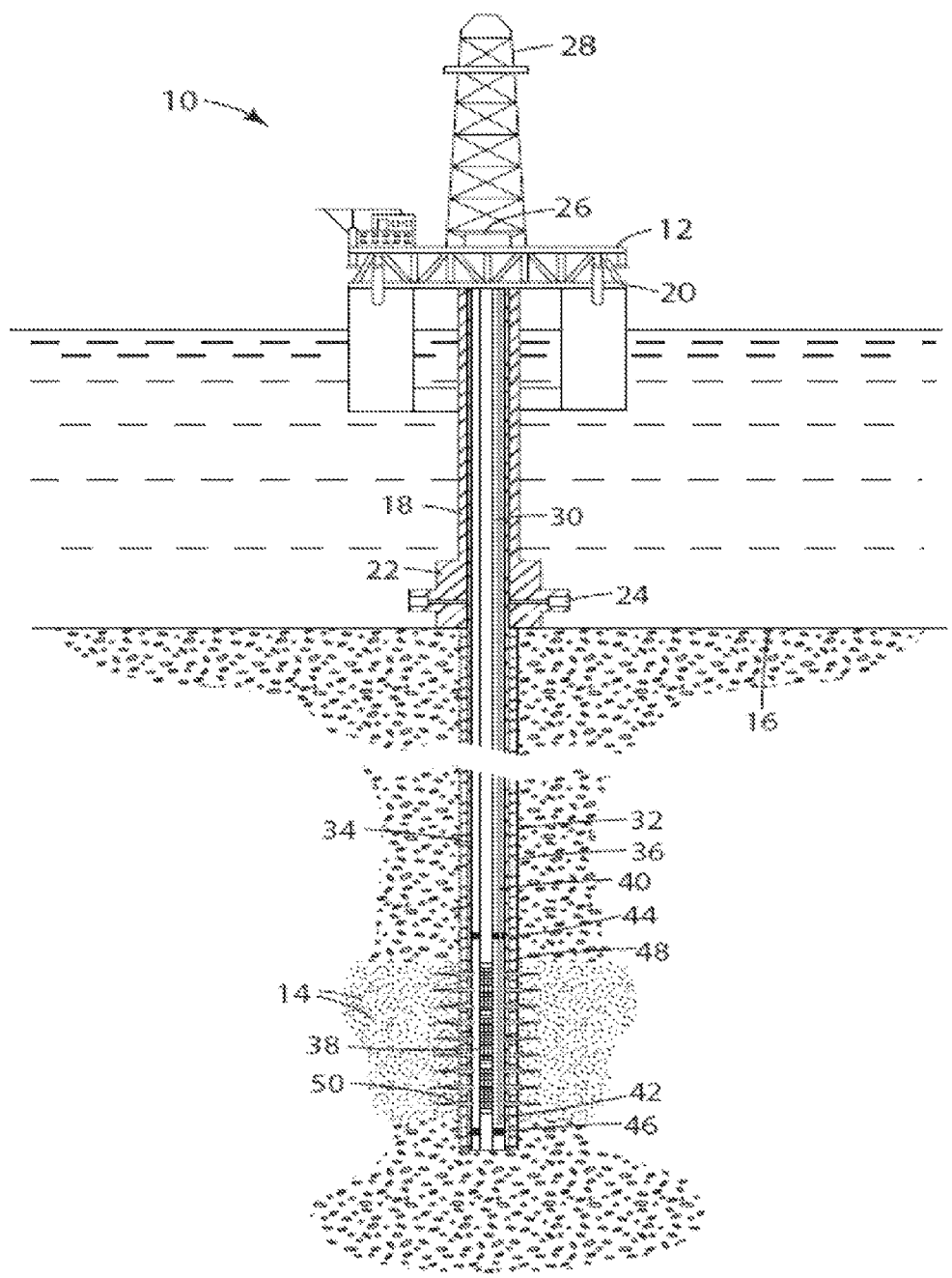
FIG. 1 is a schematic illustration of an offshore oil platform with facilities for injecting chemical solutions into the reservoir for the purpose of flooding the reservoir to enhance the oil recovery according to some embodiments of the present invention.

Referring to FIG. 1, an exemplary offshore oil platform is schematically illustrated and generally designated 10. Semi-submersible platform 12 is centered over submerged hydrocarbon-bearing formation 14 located below sea floor 16. Subsea conduit 18 extends from deck 20 of platform 12 to wellhead installation 22 including blowout preventers 24. Platform 12 is shown with hoisting apparatus 26 and derrick 28 for raising and lowering pipe strings such as work string 30. Of course, similar formations are found on land and the present invention is equally applicable to the same.

Wellbore 32 extends through the various earth strata including hydrocarbon-bearing formation 14. Casing 34 is cemented within wellbore 32 by cement 36. Work string 30 may include various tools including, for example, sand control screen assembly 38 which is positioned within wellbore 32 adjacent to hydrocarbon-bearing formation 14. Also extending from platform 12 through wellbore 32 is fluid delivery tube 40 having fluid or gas discharge section 42 positioned adjacent to hydrocarbon-bearing formation 14, shown with production zone 48 between packers 44, 46. When it is desired to treat the near-wellbore region of hydrocarbon-bearing formation 14 adjacent to production zone 48, work string 30 and fluid delivery tube 40 are lowered through casing 34 until sand control screen assembly 38 and fluid discharge section 42 are positioned adjacent to the near-wellbore region of hydrocarbon-bearing formation 14 including perforations 50. Thereafter, a composition described herein is pumped down delivery tube 40 to progressively treat the near-wellbore region of hydrocarbon-bearing formation 14.

Figure 2:
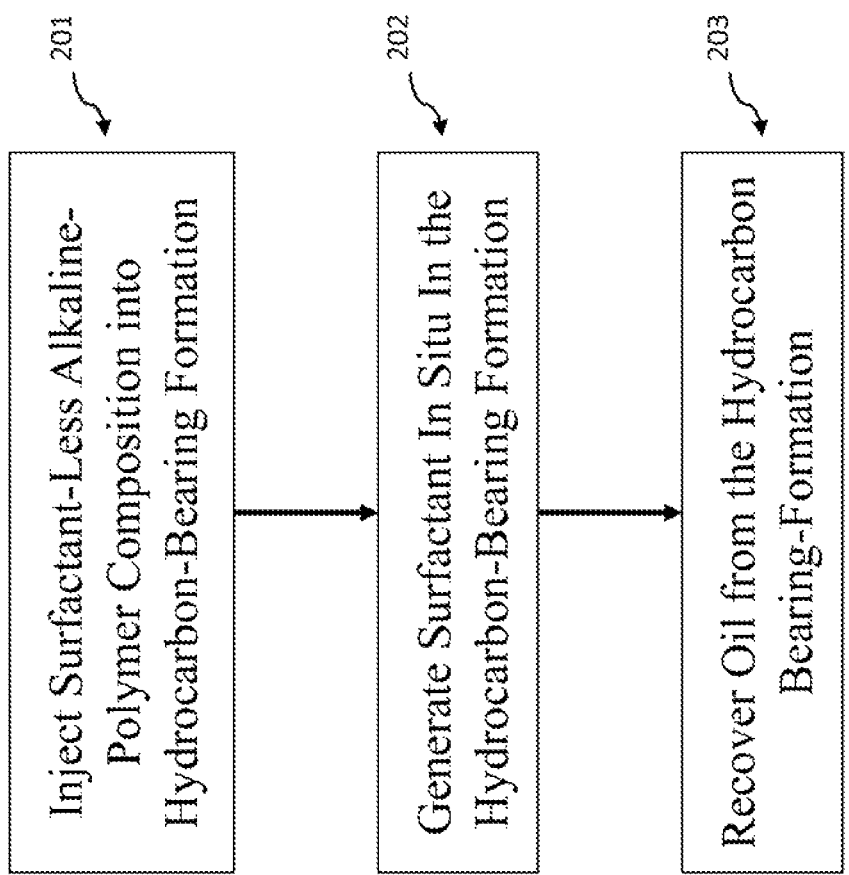
FIG. 2 depicts a method of the present invention in which a composition is used to treat a hydrocarbon-bearing formation.

FIG. 2 shows a process by which compositions of the present invention are used to treat a hydrocarbon-bearing formation to recover oil. In step 201, a surfactant-less alkaline-co-solvent-polymer composition is pumped down hole into the hydrocarbon-bearing formation. The composition includes water, a chelating agent, an alkaline agent (which can be the same as the chelating agent), a co-solvent, and a polymer.

The water is hard water or hard brine. As noted above, hard water and hard brine generally include divalent cations (such as $Ca^{+2}$ and $Mg^{+2}$).

The chelating agent functions to form a soluble salt with the hardness ions when subject to reservoir conditions. For instance, the chelating agent can include EDTA $Na_4$ or EDTA/$Na_2CO_3$. The concentration of the chelating agent in the composition is generally between 0.1 wt % and 10 wt %. In some embodiments of the present invention, the chelating agent can be a combination of EDTA $Na_4$ and $Na_2CO_3$, and each are at a concentration of 1 wt % of the composition. In some embodiments of the present invention, the chelating agent can be EDTA $Na_4$ and the weight ratio of the EDTA to the divalent cations (in the hard water or hard brine) can be at least about 9:1. Other types of chelating agents include ethylenediaminetetraacetic acid (EDTA), other EDTA salts, acrylic polymers, ascorbic acid, tetrasodium iminodisuccinate, citric acid, dicarboxymethylglutamic acid, ethylenediaminedisuccinic acid (EDDS), maleic acid, nitrilotriacetic acid (NTA), nonpolar amino acids, methionine, oxalic acid, phosphoric acid, polar amino acids, arginine, asparagine, aspartic acid, glutamic acid, glutamine, lysine, ornithine, siderophores, desferrioxamine B, hydrolysed wool, succinic acid, alkali earth metal hydroxides, NaOH, KOH, LiOH, ammonia, $NaHCO_3$, Na-metaborate, sodium silicate, sodium orthosilicate, other polycarboxylates, and combinations thereof.

The co-solvent is a hydrophilic co-solvent. For instance, the co-solvent can be a non-ionic co-solvent, such as an ethoxylate (like $C_{12-15}$-12EO). The concentration of the co-solvent in the composition is generally between 0.1 wt % and 1 wt %, and more typically between 0.2 wt % and 0.4 wt %. Other types of co-solvents include short chain alcohols, glycol ethers and other derivatives of the short chain alcohol, or combinations and modifications thereof.

The alkaline agent can be the chelating agent described above. In such instance, the concentration of the chelating agent in the composition is in excess (i.e., the concentration of the chelating agent exceeds the amount needed to complex with the hardness ions). Alternatively, the alkaline agent can be different from the chelating agent (or a combination of the chelating agent and a different alkaline agent). For instance, the alkaline agent can be a non-chelating amine (such as dimethylaminopropylamine, diethylenetriamine (DETA), and other polyalkylene polyamines) or an inorganic alkaline agent that provides alkalinity in the composition.

The polymer can be a high molecular weight water-soluble polymer, such as polyacrylamides, co-polymers of polyacrylamides, partially hydrolyzed polyacrylamide (HPAM) polymers, or combinations thereof.

The pH of the composition is typically basic, having a pH between about 10.0 and about 11.0. In some embodiments of the invention, the pH is between about 10.2 and 10.8.

In step 202, a surfactant is generated in-situ in the hydrocarbon-bearing formation. The generation occurs due to the interplay between the carboxylic acids in the oil, chelating agent or other alkali, and co-solvent that occurs at the reservoir conditions of the hydrocarbon-bearing formation. The chelating agent forms a salt, and, generally, does so while preventing precipitation of the divalent ions in the hard water or hard brine. The alkali generates the soaps and the co-solvent (which is hydrophilic) interacts with the in-situ generated soaps to produce an optimum surfactant.

The generation of the surfactant results in micro-emulsions. For oil recover, the optimum micro-emulsion type is Winsor Type III. Such micro-emulsions provide low interfacial tensions (IFT), which can be less than about 5 millidynes per centimeter.

In step 203, oil is recovered from the treated hydrocarbon-bearing formation.

Testing and Phase Behavior Procedures

Phase Behavior Screening: Phase behavior studies have been used to characterize chemicals for EOR. There are many benefits in using phase behavior as a screening method. Phase Behavior studies are used to determine: (1) the effect of electrolytes; (2) oil solubilization, IFT reduction, (3) micro-emulsion densities; (4) surfactant and microemulsion viscosities; (5) coalescence times; (6) identify optimal co-solvent formulations; and/or (7) identify optimal formulation for coreflood studies.

Thermodynamically stable phase can form with oil, water and surfactant mixtures. Surfactants form micellar structures at concentrations above the critical micelle concentration (CMC). The emulsion coalesces into a separate phase at the oil-water interface and is referred to as a microemulsion. A microemulsion is a surfactant-rich distinct phase consisting of surfactant, oil and water and possibly co-solvents and other components. This phase is thermodynamically stable in the sense that it will return to the same phase volume at a given temperature. Some workers in the past have added additional requirements, but for the purposes of this engineering study, the only requirement will be that the microemulsion is a thermodynamically stable phase.

The phase transition can be examined by keeping all variables fixed except for the scanning variable. The scan variable is changed over a series of pipettes and may include, but is not limited to, salinity, temperature, chemical (surfactant, alcohol, electrolyte), oil, which is sometimes characterized by its equivalent alkane carbon number (EACN), and surfactant structure, which is sometimes characterized by its hydrophilic-lipophilic balance (HLB).

For embodiments of the present invention, the scan variable was the concentration of the non-ionic co-solvent. The phase transition was first characterized by Winsor (1954) into three regions: Type I—excess oleic phase, Type III—aqueous, microemulsion and oleic phases, and the Type II—excess aqueous phase. The phase transition boundaries and some common terminology are described as follows: Type I to III—lower critical salinity, Type III to II—upper critical salinity, oil solubilization ratio (Vo/Vs), water solubilization ratio (Vw/Vs), the solubilization value where the oil and water solubilization ratios are equal is called the Optimum Solubilization Ratio ($\sigma^*$), and the electrolyte concentration where the optimum solubilization ratio occurs is referred to as the Optimal Salinity ($S^*$).

The reservoir brine is hard, and hence a 1% EDTA-4Na was used to sequester the divalent ions (640 ppm $Ca^{++}$, 260 ppm $Mg^{++}$), and sodium carbonate was used as the alkali to generate in-situ surfactant. Non-ionic co-solvent ($C_{12-15}$-12EO) was added to increase the optimal salinity. The scan was done by increasing the concentration of co-solvent concentration and hence the transition was from Winsor Type II to Winsor Type III to Winsor Type I. For these materials and conditions, the optimal co-solvent concentration was found by visually observing the oil droplets size. The optimal co-solvent concentration corresponds to a fine oil droplets size when compared to the under optimum and over optimum samples. The observations that were made are provided in Table 1 below.

TABLE 1

Phase Behavior summary using $C_{12-15}$-12EO, 1% EDTA-4Na, 1% $Na_2CO_3$, 30% oil (oil diluted with 11.5% decalin) at 35° C.

| Co-Solvent Level (%) | Micro-emulsion Type |
|---|---|
| 0.0% | Type II |
| 0.1% | Type II |
| 0.2% | Type III |
| 0.3% | Type III |
| 0.4% | Type III (Optimum) |
| 0.5% | Type I |
| 0.8% | Type 1 |
| 1.0% | Type I |

Equipment: Phase behavior experiments were carried out using the following materials and equipment.

Mass Balance: Mass balances were used to measure chemicals for mixtures and determine initial saturation values of cores.

Water Deionizer: Deionized (DI) water was prepared for use with all the experimental solutions using a Nanopure™ filter system. This filter used a recirculation pump and monitors the water resistivity to indicate when the ions have been removed. Water was passed through a 0.45 micron filter to eliminate undesired particles and microorganisms prior to use.

Borosilicate Pipettes: Standard 5 mL borosilicate pipettes with 0.1 mL markings were used to create phase behavior scans as well as run dilution experiments with aqueous solutions. The ends were sealed using a propane and oxygen flame.

Pipette Repeater: An Eppendorf Repeater Plus® instrument was used for most of the pipetting. This was a handheld dispenser calibrated to deliver between 25 microliter and 1 ml increments. Disposable tips were used to avoid contamination between stocks and allow for ease of operation and consistency.

Propane-Oxygen Torch: A mixture of propane and oxygen gas was directed through a Bernz-O-Matic flame nozzle to create a hot flame about ½ inch long. This torch was used to flame-seal the glass pipettes used in phase behavior experiments.

Convection Ovens: Several convection ovens were used to incubate the phase behaviors and core flood experiments at the reservoir temperatures. The phase behavior pipettes were primarily kept in Blue M and Mermen ovens that were monitored with mercury thermometers and oven temperature gauges to ensure temperature fluctuations were kept at a minimal between recordings.

pH Meter: An ORION research model 701/digital ion analyzer with a pH electrode was used to measure the pH of most aqueous samples to obtain more accurate readings. This was calibrated with 4.0, 7.0 and 10.0 pH solutions. For rough measurements of pH, indicator papers were used with several drops of the sampled fluid.

Phase Behavior Calculations: The oil and water solubilization ratios can be calculated from interface measurements taken from phase behavior pipettes. In this particular case there were no calculations involved and the optimal condition was determined by visual observation.

Phase Behavior Methodology: The methods for creating, measuring and recording observations are described herein. Scans were made using the methodology discussed above. Oil was added to most solutions to see if a microemulsion formed, how long it took to form and equilibrate if it formed, what type of microemulsion formed and some of its properties such as viscosity. However, the behavior of aqueous mixtures without oil added is also important and is also done in some cases to determine if the aqueous solution was clear and stable over time, becomes cloudy or separated into more than one phase.

Preparation of samples: Phase behavior samples were made by first preparing co-solvent stock solutions and combining them with brine stock solutions in order to observe the behavior of the mixtures over the scan range.

Co-Solvent Solution Preparation: Co-solvent stocks were based on active weight-percent material. The masses of co-solvent and de-ionized water (DI) were measured out on a balance and mixed in glass jars using magnetic stir bars. The order of addition was recorded on a mixing sheet along with actual masses added and the pH of the final solution. Brine solutions were created at the necessary weight percent concentrations for making the scans.

Polymer Stock: Often these stocks were quite viscous and made pipetting difficult so they are diluted with de-ionized water accordingly to improve ease of handling. Mixtures with polymer were made only for those formulations that showed good behavior and merited additional study for possible testing in core floods. Consequently, scans including polymer were limited since they are done only as a final evaluation of compatibility.

Pipetting Procedure: Phase behavior components were added volumetrically into 5 ml pipettes using an Eppendorf Repeater Plus or similar pipetting instrument. Co-solvent and brine stocks were mixed with DI water into labeled pipettes and brought to temperature before agitation. Almost all of the phase behavior experiments were initially created with a water oil ratio (WOR) of 1:1, which involved mixing 2 ml of the aqueous phase with 2 ml of the evaluated crude oil or hydrocarbon, and different WOR experiments are mixed accordingly. The data given for the experiments shown in Table 1 were with 30% oil (11.5% decalin). The typical phase behavior scan consisted of 10-20 pipettes, each pipette being recognized as a data point in the series.

Order of Addition: Consideration had to be given to the addition of the components since the concentrations were often several fold greater than the final concentration. Therefore, an order was established to prevent any adverse effects resulting from polymer coming into direct contact with the concentrated electrolytes. The desired sample compositions are made by combining the stocks in the following order: (1) Brine stock(s); (2) De-ionized water; (3) Co-Solvent stock; (4) Polymer stock; and (5) Crude oil or hydrocarbon. Any air bubbles trapped in the bottom of the pipettes are tapped out (prior to the addition of surfactant to avoid bubbles from forming).

Initial Observations. Once the components were added to the pipettes, sufficient time was allotted to allow all the fluid to drain down the sides. Then aqueous fluid levels were recorded before the addition of oil. These measurements were marked on record sheets. Levels and interfaces were recorded on these documents with comments over several days and additional sheets are printed as necessary.

Sealing and Mixing: The pipettes were blanketed with argon gas to prevent the ignition of any volatile gas present by the flame sealing procedure. The tubes were then sealed with the propane-oxygen torch to prevent loss of additional volatiles when placed in the oven. Pipettes were arranged on the racks to coincide with the change in the scan variable. Once the phase behavior scan was given sufficient time to reach reservoir temperature (15-30 minutes), the pipettes were inverted several times to provide adequate mixing. Tubes were observed for low tension upon mixing by looking at droplet size and how uniform the mixture appeared.

Measurements and Observations: Phase behavior experiments were allowed to equilibrate in oven that was set to the reservoir temperature for the crude oil being tested. The droplet size of oil on mixing), was visually observed for all the pipettes over time, and optimal condition was identified.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Definitions

To facilitate the understanding of this invention, a number of terms are defined below. Terms defined herein have meanings as commonly understood by a person of ordinary skill in the areas relevant to the present invention.

For methods of treating a hydrocarbon-bearing formation and/or a well bore, the term "treating" includes placing a chemical (e.g., a fluorochemical, cationic polymer, or corrosion inhibitor) within a hydrocarbon-bearing formation using any suitable manner known in the art (e.g., pumping, injecting, pouring, releasing, displacing, spotting, or circulating the chemical into a well, well bore, or hydrocarbon-bearing formation.

The term "polymer" refers to a molecule having a structure that essentially includes the multiple repetition of units derived, actually or conceptually, from molecules of low relative molecular mass. The term "polymer" includes "oligomer".

The term "bonded" refers to having at least one of covalent bonding, hydrogen bonding, ionic bonding, Van Der Waals interactions, pi interactions, London forces, or electrostatic interactions.

The term "productivity" as applied to a well refers to the capacity of a well to produce hydrocarbons; that is, the ratio of the hydrocarbon flow rate to the pressure drop, where the pressure drop is the difference between the average reservoir pressure and the flowing bottom hole well pressure (i.e., flow per unit of driving force).

"Alkyl group" and the prefix "alk-" are inclusive of both straight chain and branched chain groups and of cyclic groups having up to 30 carbons (in some embodiments, up to 20, 15, 12, 10, 8, 7, 6, or 5 carbons) unless otherwise specified. Cyclic groups can be monocyclic or polycyclic and, in some embodiments, have from 3 to 10 ring carbon atoms.

"Alkylene" is the divalent form of the "alkyl" groups defined above.

"Arylalkylene" refers to an "alkylene" moiety to which an aryl group is attached.

The term "aryl" as used herein includes carbocyclic aromatic rings or ring systems, for example, having 1, 2, or 3 rings and optionally containing at least one heteroatom (e.g., O, S, or N) in the ring. Examples of aryl groups include phenyl, naphthyl, biphenyl, fluorenyl as well as furyl, thienyl, pyridyl, quinolinyl, isoquinolinyl, indolyl, isoindolyl, triazolyl, pyrrolyl, tetrazolyl, imidazolyl, pyrazolyl, oxazolyl, and thiazolyl.

"Arylene" is the divalent form of the "aryl" groups defined above. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

What is claimed is:

1. A surfactant-less alkaline-polymer composition for treating a hydrocarbon-bearing formation, said composition comprising:
   (a) water selected from the group consisting of hard water and hard brine, wherein the water comprises divalent cations selected from the group consisting of $Ca^{+2}$, $Ba^{+2}$, $Mg^{+2}$, $Sr^{+2}$, and combinations thereof;
   (b) a chelating agent, wherein the agent is operable for forming a soluble salt with the divalent cations when subjected to reservoir conditions of the hydrocarbon-bearing formation, and wherein the chelating agent is selected from the group consisting of ethylenediaminetetraacetic acid (EDTA), ethylenediamine tetracetic acid tetra sodium salt (EDTA $Na_4$), EDTA salts, acrylic polymers, ascorbic acid, tetrasodium iminodisuccinate, citric acid, dicarboxymethylglutamic acid, ethylenediaminedisuccinic acid (EDDS), maleic acid, nitrilotriacetic acid (NTA), nonpolar amino acids, methionine, oxalic acid, phosphoric acid, polar amino acids, arginine, asparagine, aspartic acid, glutamic acid, glutamine, lysine, ornithine, siderophores, desferrioxamine B, hydrolysed wool, succinic acid, sodium silicate, sodium orthosilicate, other polycarboxylates, and combinations thereof;
   (c) an alkaline agent, wherein
      (i) the alkaline agent comprises the chelating agent, a different alkaline agent, or a combination thereof, and
      (ii) the alkaline agent is operable for interacting with carboxylic acid in the hydrocarbon-bearing formation at reservoir conditions of the hydrocarbon-bearing formation to generate an in-situ soap;
   (d) a non-ionic co-solvent, wherein
      (i) the co-solvent is hydrophilic,
      (ii) the co-solvent is operable for interacting with the in-situ generated soap at the reservoir conditions of the hydrocarbon-bearing formation to produce an optimum surfactant, and
   (e) a polymer, wherein the water, the chelating agent, the alkaline agent, the co-solvent, and the polymer are mixed together in the composition, and
   wherein the surfactant-less alkaline-polymer composition does not include a surfactant other than the non-ionic co-solvent.

2. The composition of claim 1, wherein the chelating agent is further operable for preventing precipitation of the divalent cations when subjected to reservoir conditions of the hydrocarbon-bearing formation.

3. The composition of claim 1, wherein the chelating agent is the alkaline agent.

4. The composition of claim 1, wherein the alkaline agent comprises $Na_2CO_3$.

5. The composition of claim 1, wherein the chelating agent comprises EDTA $Na_4$.

6. The composition of claim 1, wherein the chelating agent comprises EDTA $Na_4$ and the alkaline agent comprises $Na_2CO_3$.

7. The composition of claim 1, wherein the concentration of the chelating agent in the composition is between 0.1 wt % and 10 wt %.

8. The composition of claim 7, wherein the chelating agent comprises EDTA $Na_4$.

9. The composition of claim 1, wherein the co-solvent comprises an ethoxylate.

10. The composition of claim 1, wherein the co-solvent is selected from the group consisting of short chain alcohols, glycol ethers, derivatives of short chain alcohols, and combinations and modifications thereof.

11. The composition of claim 1, wherein the concentration of the co-solvent in the composition is between about 0.1 wt % and 1 wt %.

12. The composition of claim 11, wherein the concentration of the chelating agent in the composition is between 0.1 wt % and 10 wt %.

13. The composition of claim 1, wherein the co-solvent comprises $C_{12-15}$-12EO.

14. The composition of claim 13, wherein the concentration of the $C_{12-15}$-12EO in the composition is between 0.2 wt % and 0.4 wt %.

15. The composition of claim 13, wherein the concentration of the $C_{12-15}$-12EO in the composition is about 0.4 wt %.

16. The composition of claim 1, wherein the polymer comprises a water-soluble polymer.

17. The composition of claim 1, wherein the polymer is selected from the group consisting of polyacrylamides, copolymers of polyacrylamides, partially hydrolyzed polyacrylamide (HPAM) polymers, and combinations thereof.

18. The composition of claim 1, wherein the alkaline agent comprises a non-chelating amine or an inorganic alkaline agent providing alkalinity.

19. The composition of claim 1, wherein the alkaline agent comprises a non-chelating amine selected from the group consisting of dimethylaminopropylamine, diethylenetriamine (DETA), and other polyalkylene polyamines.

20. The composition of claim 1, wherein the chelating agent comprises EDTA $Na_4$ and the weight ratio of the EDTA to the divalent cations is at least about 9:1.

21. The composition of claim 1, wherein the pH of the composition is between about 10.0 and about 11.0.

22. The composition of claim 1, wherein the pH of the composition is between 10.2 and 10.8.

23. The composition of claim 1, wherein the reservoir conditions comprise a temperature between 25° C. and 120° C.

24. The composition of claim 1, wherein the composition is operable for forming Winsor Type III micro-emulsions upon injection into the hydrocarbon-bearing formation.

25. The composition of claim 24, wherein the Winsor Type III micro-emulsions have interfacial tensions less than about 5 millidynes/cm.

26. A method of treating a hydrocarbon-bearing formation to recover oil comprising:
   (a) injecting a surfactant-less alkaline-polymer composition into the hydrocarbon bearing formation, wherein the surfactant-less alkaline-polymer composition comprises
      (i) water, wherein
         (A) the water is selected from the group consisting of hard water and hard brine, and
         (B) the water comprises divalent cations selected from the group consisting of $Ca^{+2}$, $Ba^{+2}$, $Mg^{+2}$, $Sr^{+2}$, and combinations thereof,
      (ii) a chelating agent, wherein the chelating agent is selected from the group consisting of ethylenediaminetetraacetic acid (EDTA), ethylenediamine tetracetic acid tetra sodium salt (EDTA $Na_4$), EDTA salts, acrylic polymers, ascorbic acid, tetrasodium iminodisuccinate, citric acid, dicarboxymethylglutamic acid, ethylenediaminedisuccinic acid (EDDS), maleic acid, nitrilotriacetic acid (NTA), nonpolar amino acids, methionine, oxalic acid, phosphoric acid, polar amino acids, arginine, asparagine, aspartic acid, glutamic acid, glutamine, lysine, ornithine, siderophores, desferrioxamine B, hydrolysed wool, succinic acid, sodium silicate, sodium orthosilicate, other polycarboxylates, and combinations thereof.
- (iii) an alkaline agent, wherein the alkaline agent comprises the chelating agent, a different alkaline agent, or a combination thereof,
- (iv) a non-ionic co-solvent, wherein the co-solvent is hydrophilic, and
- (v) a polymer, wherein the water, the agent, the co-solvent, the alkaline agent, and the polymer are mixed together in the surfactant-less alkaline-polymer composition; and wherein the surfactant-less alkaline-polymer composition does not include a surfactant other than the non-ionic co-solvent.

(b) generating a surfactant in-situ in the hydrocarbon bearing formation, wherein
- (i) the alkaline agent forms a soap after injecting the surfactant-less alkaline-polymer composition into the hydrocarbon formation, and
- (ii) the co-solvent interacts with the in-situ generated soap and makes an optimum surfactant; and (c) recovering the oil from the hydrocarbon-bearing formation.

27. The method of claim 26, wherein the chelating agent prevents precipitation of the divalent ions in the water during generation of the surfactant in-situ.

28. The method of claim 26, wherein the chelating agent is the alkaline agent.

29. The method of claim 26, wherein the alkaline agent comprises $Na_2CO_3$.

30. The method of claim 26, wherein the chelating agent comprises EDTA $Na_4$.

31. The method of claim 26, wherein the chelating agent comprises EDTA $Na_4$ and the alkaline agent comprises $Na_2CO_3$.

32. The method of claim 26, wherein the concentration of the chelating agent in the composition is between 0.1 wt % and 10 wt %.

33. The method of claim 32, wherein the chelating agent comprises EDTA $Na_4$.

34. The method of claim 26, wherein the co-solvent comprises an ethoxylate.

35. The method of claim 26, wherein the co-solvent is selected from the group consisting of short chain alcohols, glycol ethers and other alkoxylates of the short chain alcohol, and combinations and modifications thereof.

36. The method of claim 26, wherein the concentration of the co-solvent in the surfactant-less alkaline-polymer composition is between about 0.1 wt % and 1 wt %.

37. The method of claim 36, wherein the concentration of the chelating agent in the surfactant-less alkaline-polymer composition is between 0.1 wt % and 10 wt %.

38. The method of claim 26, wherein the co-solvent is $C_{12-15}$-12EO.

39. The method of claim 38, wherein the concentration of the $C_{12-15}$-12EO in the surfactant-less alkaline-polymer composition is between 0.2 wt % and 0.4 wt %.

40. The method of claim 38, wherein the concentration of the $C_{12-15}$-12EO in the surfactant-less alkaline-polymer composition is about 0.4 wt %.

41. The method of claim 26, wherein the polymer comprises a water-soluble polymer.

42. The method of claim 41, wherein the polymer is selected from the group consisting of polyacrylamides, co-polymers of polyacrylamides, partially hydrolyzed polyacrylamide (HPAM) polymers, and combinations thereof.

43. The method of claim 26, wherein the alkaline agent comprises a non-chelating amine or an inorganic alkaline agent providing alkalinity.

44. The method of claim 26, wherein the alkaline agent comprises a non-chelating amine selected from the group consisting of dimethylaminopropylamine, diethylenetriamine (DETA), and other polyalkylene polyamines.

45. The method of claim 26, wherein the chelating agent comprises EDTA $Na_4$ and the weight ratio of the EDTA to the divalent cations is at least about 9:1.

46. The method of claim 26, wherein the pH of the surfactant-less alkaline-polymer composition is between about 10.0 and about 11.0.

47. The method of claim 26, wherein the pH of the surfactant-less alkaline-polymer composition is between 10.2 and 10.8.

48. The method of claim 26, wherein the downhole conditions comprise a temperature of the hydrocarbon bearing formation between 25° C. and 120° C.

49. The method of claim 26, wherein the generation of the in-situ surfactant results in Winsor Type III micro-emulsions.

50. The method of claim 49, wherein the Winsor Type III micro-emulsions have interfacial tensions less than about 5 millidynes/cm.

* * * * *